(12) United States Patent
Schmidt et al.

(10) Patent No.: US 11,983,939 B2
(45) Date of Patent: May 14, 2024

(54) CHANGING VEHICLE CONFIGURATION BASED ON VEHICLE STORAGE COMPARTMENT CONTENTS

(71) Applicant: Ford Global Technologies, LLC, Dearborn, MI (US)

(72) Inventors: David Schmidt, Dearborn, MI (US); Richard A. Kreder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 787 days.

(21) Appl. No.: 16/976,919

(22) PCT Filed: Mar. 9, 2018

(86) PCT No.: PCT/US2018/021717
§ 371 (c)(1),
(2) Date: Aug. 31, 2020

(87) PCT Pub. No.: WO2019/172927
PCT Pub. Date: Sep. 12, 2019

(65) Prior Publication Data
US 2021/0012125 A1 Jan. 14, 2021

(51) Int. Cl.
*G06V 20/59* (2022.01)
*B60P 3/00* (2006.01)
(Continued)

(52) U.S. Cl.
CPC .............. *G06V 20/59* (2022.01); *B60R 11/04* (2013.01); *G05D 1/0212* (2013.01);
(Continued)

(58) Field of Classification Search
CPC . G06V 20/59; B60R 11/04; B60R 2011/0036; G05D 1/0212; G05D 1/0276;
(Continued)

(56) References Cited

U.S. PATENT DOCUMENTS 7,151,447 B1 12/2006 Willms et al.
7,455,225 B1 11/2008 Hadfield et al.
(Continued)

OTHER PUBLICATIONS

International Search Report of the International Searching Authority for PCT/US2018/021717 dated Jun. 11, 2018.

*Primary Examiner* — Jason Holloway
*Assistant Examiner* — Madison B Emmett
(74) *Attorney, Agent, or Firm* — Brandon Hicks; Eversheds Sutherland (US) LLP

(57) ABSTRACT

The present invention extends to methods, systems, and computer program products for changing vehicle configuration based on vehicle storage compartment contents. At an autonomous vehicle, a camera is mounted inside a storage compartment. The camera monitors the interior of the storage compartment. The camera can confirm that the storage compartment is empty when it is supposed to be empty and contains an object when it is supposed to contain an object. Any discrepancies can be reported to a human operator. The human operator can instruct the autonomous vehicle to change configuration to address discrepancies. In one aspect, a machine-learning camera memorizes a background pattern permeated to a surface of the storage compartment. The machine-learning camera detects objects in the storage compartment based on disturbances to the background pattern.

14 Claims, 10 Drawing Sheets

(51) Int. Cl.
  *B60R 11/00* (2006.01)
  *B60R 11/04* (2006.01)
  *G05D 1/00* (2006.01)
  *G06Q 10/083* (2023.01)
  *H04N 7/18* (2006.01)
(52) U.S. Cl.
  CPC ......... *G05D 1/0276* (2013.01); *G06Q 10/083* (2013.01); *B60P 3/007* (2013.01); *B60R 2011/0036* (2013.01); *H04N 7/18* (2013.01)
(58) Field of Classification Search
  CPC ....... G06Q 10/083; G06Q 10/08; B60P 3/007; H04N 7/18; H04W 4/35; H04W 4/40; G06N 20/00
  See application file for complete search history.

(56) References Cited

U.S. PATENT DOCUMENTS

| | | | |
|---|---|---|---|
| 10,303,961 B1* | 5/2019 | Stoffel | H04W 4/44 |
| 11,358,511 B1* | 6/2022 | Metellus | A47B 96/00 |
| 2003/0125855 A1 | 7/2003 | Breed et al. | |
| 2003/0227382 A1* | 12/2003 | Breed | G08B 13/2462 340/568.1 |
| 2006/0248763 A1* | 11/2006 | Tarabella | G09F 21/048 40/590 |
| 2008/0144944 A1* | 6/2008 | Breed | G06V 40/103 382/224 |
| 2014/0036072 A1 | 2/2014 | Lyall et al. | |
| 2016/0185466 A1* | 6/2016 | Dreano, Jr. | A47G 29/141 705/26.81 |
| 2016/0196527 A1 | 7/2016 | Bose et al. | |
| 2017/0080900 A1* | 3/2017 | Huennekens | G05D 1/0088 |
| 2017/0344010 A1* | 11/2017 | Rander | G06Q 10/06311 |
| 2018/0072265 A1* | 3/2018 | Samadani | G08G 1/20 |
| 2018/0300676 A1* | 10/2018 | Peterson | B60Q 1/507 |
| 2019/0049995 A1* | 2/2019 | Ferguson | B60P 3/007 |
| 2019/0064800 A1* | 2/2019 | Frazzoli | G06V 20/597 |
| 2019/0197904 A1* | 6/2019 | Muta | G06Q 50/28 |
| 2019/0287051 A1* | 9/2019 | Heinla | G06Q 50/28 |
| 2020/0160075 A1* | 5/2020 | Muiter | G06V 20/64 |
| 2022/0289075 A1* | 9/2022 | Schmalenberg | G01V 9/005 |

* cited by examiner

CHANGING VEHICLE CONFIGURATION BASED ON VEHICLE STORAGE COMPARTMENT CONTENTS

BACKGROUND

1. Field of the Invention

This invention relates generally to the field of changing vehicle configurations, and, more particularly, to changing vehicle configuration based on the contents of vehicle storage compartments.

2. Related Art

Autonomous vehicles (AVs) can be equipped with various (and possibly secured) storage compartments that can be used for object delivery and/or object pickup. For example, an autonomous pizza delivery vehicle can include a pizza warming oven for keeping pizzas warm during transit a customer. Similarly, an autonomous grocery delivery vehicle can include a refrigerator, a freezer, and another storage compartment for other grocery items (possibly for grocery bags) to prevent food from spoiling during transit to a customer. Likewise, an autonomous package delivery vehicle can include one or more storage compartments for holding packages in transit to a customer.

In other cases, an autonomous vehicle with a storage compartment is sent to a customer to accept a returned object. The customer can place the returned object into the storage compartment and the autonomous vehicle can return to a designated location, such as, for example, a warehouse, a store, etc.

BRIEF DESCRIPTION OF THE DRAWINGS

The specific features, aspects and advantages of the present invention will become better understood with regard to the following description and accompanying drawings where.

DETAILED DESCRIPTION

Figure 1:
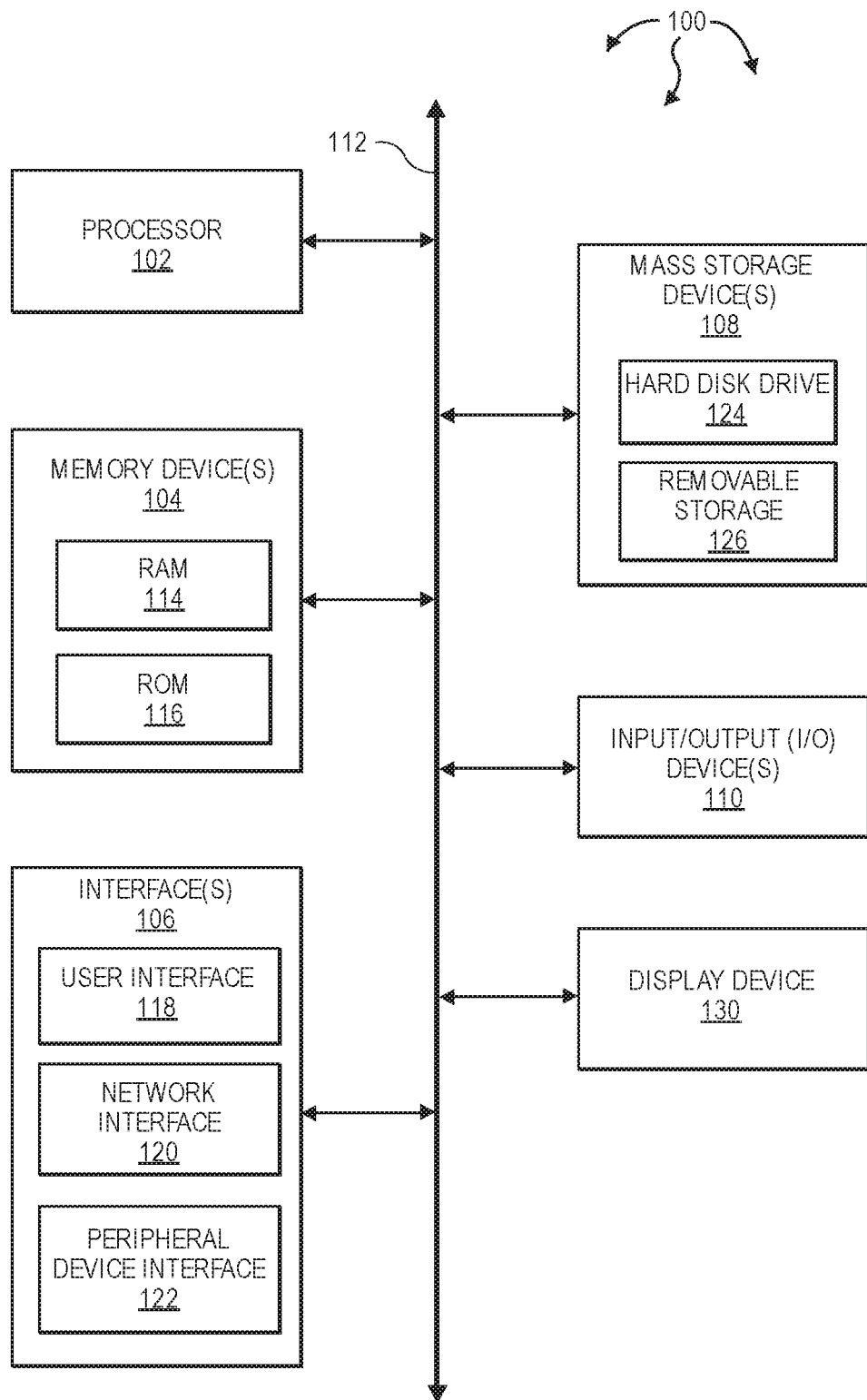
FIG. 1 illustrates an example block diagram of a computing device.

The present invention extends to methods, systems, and computer program products for changing vehicle configuration based on vehicle storage compartment contents. In some aspects, an autonomous vehicle is used for delivering an object. For example, an object can be placed in a vehicle storage compartment and the autonomous vehicle can then travel to a customer location. At the customer location, a customer can remove the object from the vehicle storage compartment. After the object is removed, the autonomous vehicle can return to a designated location, for example, back to a store or a warehouse.

In other aspects, an autonomous vehicle is used to pick up an object. For example, the autonomous vehicle can travel to a customer location with an empty vehicle storage compartment. At the customer location, a customer can place the returned object into the vehicle storage compartment. After the object is placed into the vehicle storage compartment, the autonomous vehicle can return to a designated location, for example, back to a store or a warehouse. At the designated location, an employee can then remove the object from the vehicle storage compartment.

Generally, it is appropriate to ensure that vehicle storage compartments are actually empty when expected to be empty and actually contain an (appropriate or correct) object when expected to contain the (appropriate or correct) object. However, an autonomous vehicle may not include a human. As such, vehicle storage compartments of an autonomous vehicle can be electronically monitored both before and after travel to a customer location and before and after a customer contact. For example, cameras mounted inside vehicle storage compartments can be used to monitor the interior of the vehicle storage compartments.

For object deliveries, a camera can be used to monitor a vehicle storage compartment after purported loading at a loading location (e.g., to confirm presence of a delivery object in the vehicle storage compartment) and after purported unloading at a customer location (e.g., to confirm the object has been retrieved). For object pickups, a camera can be used to monitor vehicle storage compartments prior to leaving for a customer location (e.g., to confirm the vehicle storage compartment is empty) and after purported loading at the customer location (e.g., to confirm presence of a returned object in the vehicle storage compartment).

In one aspect, a machine-learning camera is used to monitor a vehicle storage compartment. The machine-learning camera is mounted inside the vehicle storage compartment. An artificially created background is permeated onto an interior surface of the vehicle storage compartment (e.g., a surface where objects are placed for transport). The artificially created background can include a principal feature or a known pattern. The artificially created background can be configured to help objects stand out and reduce the likelihood of objects blending in with the artificially created background.

The machine-learning camera memorizes the artificially created background, for example, as a reference image, including learning specific features (e.g., one or more of spectral, spatial, and temporal features) that can be used to characterize the background appearance of specific regions of the interior of the vehicle storage compartment. Image processing decision rules can be derived for background classification of the principal feature or known pattern.

The machine-learning camera can detect any changes or disturbances to the background caused by objects present on the surface (within the vehicle storage container). A non-zero difference between the reference image and a current image of the artificially created background can indicate a disturbance. Thus, a foreground object can be detected through change classification of the principal background feature or known pattern. Upon detecting an object in a vehicle storage compartment, a human can confirm if the object is authorized. Detection of an unauthorized object can occur when a foreign object is present in a vehicle storage compartment but the vehicle storage container should be empty. Upon detection of a foreign or unauthorized object, the machine-learning camera can provide imagery from inside the vehicle storage container to another computer system.

In one aspect, the computer system is at a central hub where a human can assess the disposition of and/or identity the foreign object. If a foreign object is a nefarious, dangerous, or hazardous object, the human can take precautionary actions with an autonomous vehicle and notify the proper authorities. If the foreign object belongs to a customer, the customer can be notified via text, email, or voice that the foreign object was left in the vehicle storage container. The human can also have the autonomous vehicle stay at or return to a customer location. A foreign object belonging to a customer can be a delivery object the customer failed to retrieve from the vehicle storage compartment or an object (e.g., cell phone, keys, etc.) the customer inadvertently placed in the vehicle storage compartment. If the foreign object is a "nuisance" object, such as, an empty bag or box, the human can allow the autonomous vehicle to return to a designated location (e.g., to a store or warehouse or to another delivery location).

In one aspect, an artificially created background is inside the visible light spectrum and is visible to the human eye. In another aspect, an artificially created background is outside the visible light spectrum and is not visible to the human eye. For example, the artificially created background can be in the InfraRed (IR) spectrum, UltraViolet (UV) spectrum, etc.

As such, prior to object delivery, a machine-learning camera can monitor a vehicle storage compartment at a loading location to confirm that the vehicle storage compartment contains one or more objects (e.g., pizzas, groceries, packages, boxes, bags, etc.) for delivery to the customer. After a customer delivery, the machine-learning camera can monitor the vehicle storage compartment to confirm that the vehicle storage compartment is empty. If the vehicle storage compartment is not empty, a human operator can be notified and can take appropriate action.

Similarly, prior to object pickup, the vehicle storage compartment can be monitored to confirm that the compartment is empty. If the vehicle storage compartment is not empty, a human operator can be notified and can take appropriate action, such as, for example, returning the autonomous vehicle to a warehouse or store for unloading.

After a customer pickup, the vehicle storage compartment can be monitored to confirm that the compartment includes an (authorized) object for return. If the vehicle storage compartment is empty, a human operator can be notified and take appropriate action. For example, the customer can be notified via text, email, or voice that the returned object was not placed in the vehicle storage container.

In one aspect, when a customer is returning an object, a vehicle storage compartment is monitored after any object is placed in the vehicle storage container. The machine-learning camera can provide imagery from inside the vehicle storage container to another computer system (e.g., a central hub). Based on the imagery, a human operator can confirm that the object placed in the storage container is the (authorized) returned object. If the object placed in the vehicle storage compartment is not the (authorized) returned object and is otherwise benign, the customer can be notified via text, email, or voice that the returned object was not the object placed in the vehicle storage container. If the object placed in the vehicle storage compartment is a nefarious, dangerous, or hazardous object, the human operator can take precautionary actions with an autonomous vehicle and notify the proper authorities.

Thus, in general, electronically monitoring vehicle storage containers facilitates changes to autonomous vehicle configuration to ensure proper object delivery and object pickup, address use of vehicle storage compartments for nefarious purposes, and assist in recovering objects inadvertently and/or improperly left in vehicle storage compartments.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
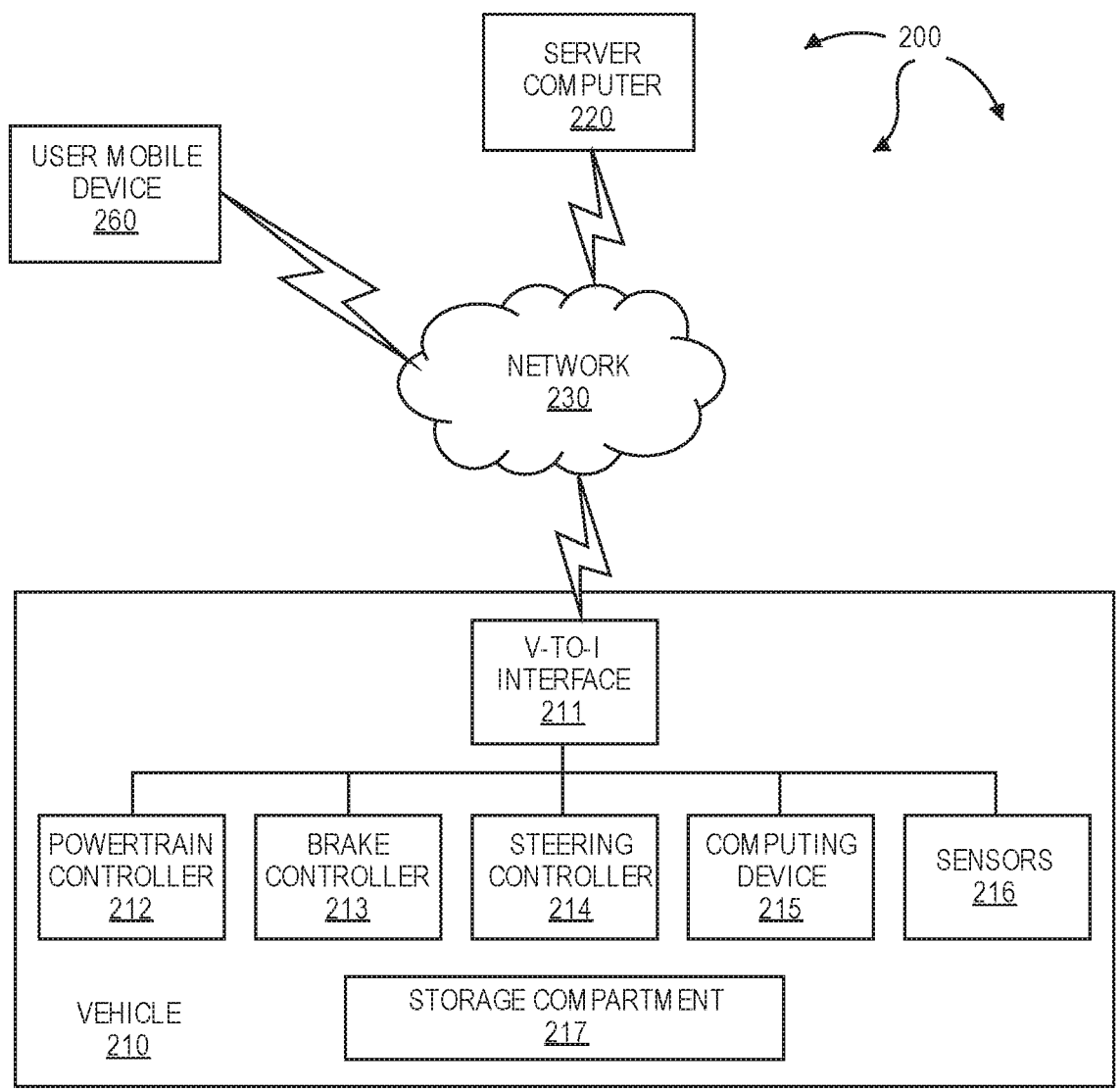
FIG. 2 illustrates an example computer architecture that facilitates network communication between an autonomous vehicle and other electronic devices.

FIG. 2 illustrates an example computer architecture 200 that facilitates network communication between an autonomous vehicle 210 and other electronic devices. Autonomous vehicle 210 can be a land-based vehicle having a plurality of wheels, such as, for example, a car, a van, a light truck, etc. and can operate fully autonomously under virtually all conditions. Autonomous vehicle 210 can be instructed to follow a path, travel to one or more destinations, etc., and can safely travel along roadways to move between locations as instructed. Autonomous vehicle 210 may also include manual operator controls so that a driver can operate autonomous vehicle 210 when appropriate.

As depicted, autonomous vehicle 210 includes Vehicle-to-Infrastructure (V-to-I) interface 211, powertrain controller 212, brake controller 213, steering controller 214, computing device 215, sensors 216, and storage compartment 217. Computing device 215 can perform computations for piloting autonomous vehicle 210 during autonomous operation. Computing device 215 can receive information regarding the operation, status, configuration, etc., of autonomous vehicle 210 and corresponding components from sensors 216. Computing device 215 can make decisions with respect to controlling autonomous vehicle 210 based on information received from sensors 216.

Sensors 216 can include a variety of devices for monitoring the operating components of autonomous vehicle 210 (e.g., tires, wheels, brakes, throttle, engine, etc.), monitoring an environment surrounding autonomous vehicle 210 (e.g., for other vehicles, for pedestrians, for cyclists, for static obstacles, etc.), and monitoring storage compartment 217. Sensors 216 can include cameras, LIDAR sensors, Radar sensors, ultrasonic sensors, etc.

For example, a radar fixed to a front bumper (not shown) of the vehicle 210 may provide a distance at autonomous vehicle 210 to a next vehicle in front of the vehicle 210. A global positioning system (GPS) sensor at autonomous vehicle 210 may provide geographical coordinates of autonomous vehicle 210. The distance(s) provided by the radar and/or other sensors 216 and/or the geographical coordinates provided by the GPS sensor can be used to facilitate autonomous operation of autonomous vehicle 210.

Computing device 215 can include any of the components described with respect to computing device 100. Computing device 215 can include programs for controlling vehicle components, including: brakes, propulsion (e.g., by controlling a combustion engine, an electric motor, a hybrid engine, etc.), steering, climate control, interior and/or exterior lights, etc., Computing device 215 can also determine whether it or a human operator is in control of autonomous vehicle 210.

Computing device 215 be communicatively coupled, for example, via a vehicle communications bus, to other computing devices and/or controllers at autonomous vehicle 210. For example, computing device 215 can be coupled to powertrain controller 212, brake controller 213, and steering controller 214 via a communications bus to monitor and/or control various corresponding vehicle components. In one aspect, V-to-I interface 211, computing device 215, sensors 216, powertrain controller 212, brake controller 213, and steering controller 214 as well as any other computing devices and/or controllers are connected via a vehicle communication network, such as, a controller area network (CAN). V-to-I interface 211, computing device 215, sensors 216, powertrain controller 212, brake controller 213, and steering controller 214 as well as any other computing devices and/or controllers can create message related data and exchange message related data via the vehicle communication network.

V-to-I interface 211 can include a network interface for wired and/or wireless communication with other devices via network 230. Server computer 220 and user mobile device 260 can also include network interfaces for wired and/or wireless communication with other devices via network 230. As such, each of autonomous vehicle 210, server computer 220, and user mobile device 260, as well as their respective components, can be connected to one another over (or be part of) network 230, such as, for example, a LAN, a WAN, and even the Internet. Accordingly, autonomous vehicle 210, server computer 220, and user mobile device 260, as well as any other connected computer systems or vehicles and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over network 230. In one aspect, V-to-I interface 211 also facilitates vehicle-to-vehicle (V-to-V) communication via ad hoc networks formed among autonomous vehicle 210 and other nearby vehicles.

Figure 3A:
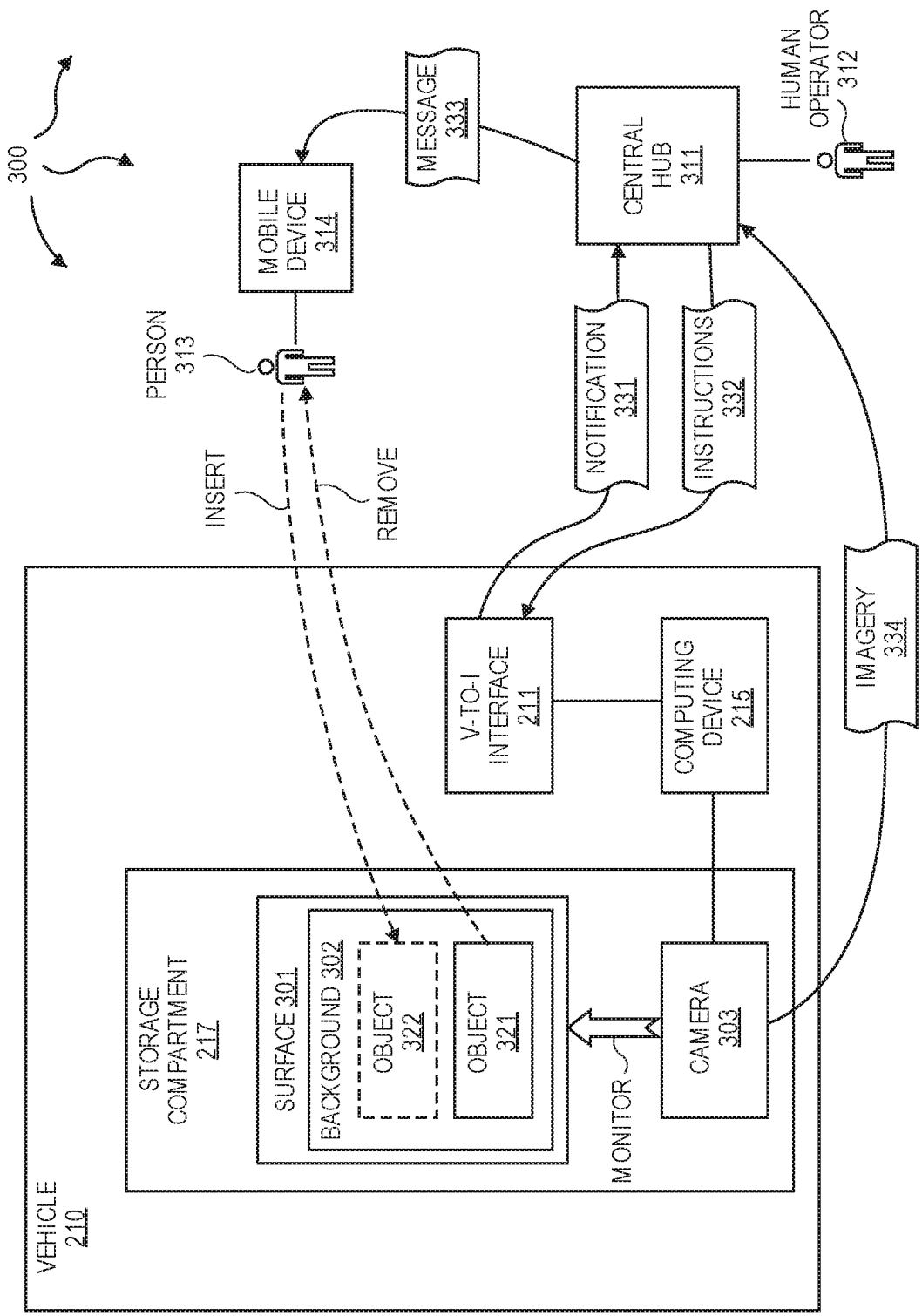
FIG. 3A illustrates an example computer architecture that facilitates delivery of an object from a vehicle storage compartment.

FIG. 3A illustrates an example computer architecture 300 that facilitates delivery of an object from a vehicle storage compartment. As depicted in computer architecture 300, storage compartment 217 further includes surface 301 and (e.g., machine-learning) camera 303. Surface 301 is permeated with background 302. Camera 303 can memorize background 302 (e.g., as a reference image) and subsequently monitor storage compartment 217 for any disturbance to background 302. A disturbance, such as, a non-zero difference between a current image of surface 301 and the reference image, can indicate the presence of object in storage compartment 217. As depicted, object 321 (e.g., a package) is currently contained in storage compartment 217. As such, camera 303 can detect a disturbance in background 302 indicative of an object being contained in storage compartment 217. Autonomous vehicle 210 can be dispatched to a location of person 313 so that person 313 can remove object 321 from storage compartment 217. Subsequent to arriving at the location, computing device 215 can detect storage compartment 217 be opened and then closed (e.g., via a contact sensor on a door, lid, top, etc. of storage compartment 217) purportedly to remove object 321 (a removal event). After storage compartment 217 is closed, camera 303 can monitor storage compartment 217 for any disturbance in background 302.

In one aspect, person 313 is a customer and object 321 is being delivered to the customer. In another aspect, person 313 is a worker and object 321 is being returned to a store, a warehouse, or other return location.

It may be that camera 303's monitoring does not detect any disturbances in background 302. As such, camera 303 considers storage compartment 217 to be empty. In response, vehicle 210 can automatically proceed to a designated location, for example, back to a warehouse or store (e.g., to pick up another package). Alternatively, V-to-I interface 211 can send notification 331 to central hub 311 notifying central hub 311 that storage compartment 217 is empty. Human operator 312 can view notification 331. In response, human operator 312 can send instructions 332 to vehicle 210 instructing vehicle 210 to proceed to a designated location.

In another aspect, camera 303 detects a disturbance in background 302 indicating the presence of an object. In response, V-to-I interface 211 can send notification 331 to central hub 311 notifying central hub 311 that an object was detected in storage compartment 217. Camera 303 can also send imagery 334 of the interior of storage compartment 217 (through V-to-I interface 211) to central hub 311. Human operator 312 can receive notification 331 and view imagery 334.

Imagery 334 may depict that object 321 is still contained in storage compartment 217. In response, human operator 312 can send message 333 (e.g., text, email, etc.) to mobile device 314. Message 333 can notify person 313 that object 321 was left in storage compartment 217. Human operator 312 can also send instructions 332 to vehicle 210. Instructions 332 can instruct vehicle 210 to return to or remain at the location so that person 313 can remove object 321 from storage compartment 217.

Imagery 334 may alternately depict object 322 contained in storage compartment 217. Object 322 may be an object that person 313 intentionally or inadvertently placed in or left in storage compartment 217.

Object 322 may be a personal item of person 313, such as, for example, a phone (mobile device 314) or keys. In response, human operator 312 can send message 333 to mobile device 314. When message 333 is an email message, message 333 can also be received at other devices associated with person 313. Message 333 can notify person 313 that object 322 was left in storage compartment 217. Human operator 312 can also send instructions 332 to vehicle 210. Instructions 332 can instruct vehicle 210 to return to or remain at the location so that person 313 can retrieve object 322 from storage compartment 217.

Object 322 may be a "nuisance" object, such as, a leftover bag, box, or other packaging associated with object 321. In response, human operator 312 can send instructions 332 to vehicle 210 instructing vehicle 210 to proceed to a designated location.

Object 322 may be a dangerous or hazardous object (e.g., explosives, chemicals, etc.). In response, human operator 312 can send instructions 332 to vehicle 210 instructing vehicle 210 to proceed to a designated safer location (e.g., away from other vehicles and people). Human operator 312 can also notify authorities including passing along the identity and last known location of person 313.

It may also be that multiple objects are contained in storage compartment 217 for delivery. If less than all of the objects are removed, human operator 312 can notify person 313 to retrieve any remaining objects.

Figure 3B:
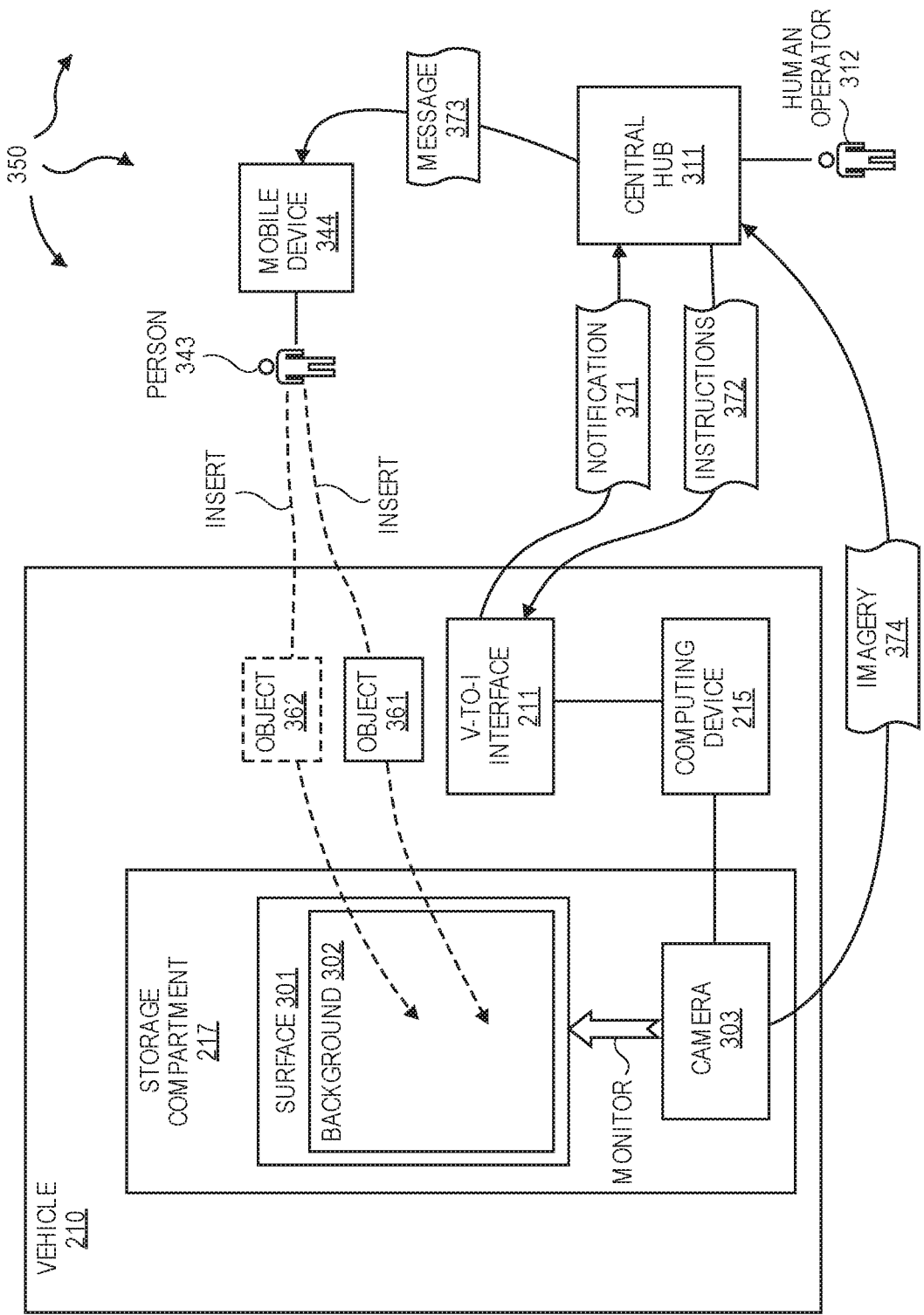
FIG. 3B illustrates an example computer architecture that facilitates pickup of an object into a vehicle storage compartment.

FIG. 3B illustrates an example computer architecture 350 that facilitates pickup of an object into a vehicle storage compartment. Vehicle 210 can be dispatched to a location of person 343 with storage compartment 217 empty so that person 343 can place an authorized object 361 in storage compartment 217. Subsequent to arriving at the location, computing device 215 can detect storage compartment 217 be opened and then closed (e.g., via a contact sensor on a door, lid, top, etc. of storage compartment 217) purportedly to insert authorized object 361 (an insertion event). After storage compartment 217 is closed, camera 303 can monitor storage compartment 217 for any disturbance in background 302.

In one aspect, person 343 is a customer and object 361 is being returned by the customer. In another aspect, person 343 is an employee and object 361 is being loaded into storage compartment 217 for delivery to a customer.

It may be that camera 303's monitoring does not detect any disturbances in background 302. As such, camera 303 considers storage compartment 217 to be empty. In response, V-to-I interface 211 can send notification 371 to central hub 311 notifying central hub 311 that storage compartment 217 is empty. Camera 303 can also send imagery 374 of the interior of storage compartment 217 (through V-to-I interface 211) to central hub 311. Human operator 312 can receive notification 371 and view imagery 374.

In response, human operator 312 can send message 373 (e.g., text, email, etc.) to mobile device 344. Message 373 can notify person 343 that storage compartment 217 remains empty and that authorized object 361 is to be inserted into storage compartment 217. Human operator 312 can also send instructions 372 to vehicle 210. Instructions 372 can instruct vehicle 210 to return to or remain at the location so that person 343 can insert authorized object 361 into storage compartment 217.

In another aspect, camera 303 detects a disturbance in background 302 indicating the presence of an object. In response, V-to-I interface 211 can send notification 371 to central hub 311 notifying central hub 311 that storage compartment 217 contains an object. Camera 303 can also send imagery 374 of the interior of storage compartment 217 (through V-to-I interface 211) to central hub 311. Human operator 312 can receive notification 371 and view imagery 374.

Imagery 374 may depict that authorized object 361 is the only object contained in storage compartment 217. In response, human operator 312 can send instructions 372 to vehicle 210 instructing vehicle 210 to proceed to a designated location, such as, a delivery location or a return location.

Imagery 374 may alternately depict that unauthorized object 362 is contained in storage compartment 217 (either alone or along with authorized object 361). Object 362 may be an object that person 343 intentionally or inadvertently placed in or left in storage compartment 217.

Object 362 may be a personal item of person 343, such as, for example, a phone (mobile device 344) or keys, an incorrect package, etc. In response, human operator 312 can send message 373 to mobile device 344. When message 373 is an email message, message 373 can also be received at other devices associated with person 343. Message 373 can notify person 343 that object 362 is to be retrieved from storage compartment 217 and that only authorized object 361 is to be inserted into storage compartment 217. Human operator 312 can also send instructions 372 to vehicle 210. Instructions 372 can instruct vehicle 210 to return to or remain at the location so that person 343 can retrieve object 362 from storage compartment 217 and possibly insert authorized object 361 into storage compartment 217.

Object 362 may be a "nuisance" object that is not authorized but is otherwise benign. If object 362 is a "nuisance" object and authorized object 361 is not contained in storage compartment 217, a response can be similar to the response when object 362 is a personal item. On the other hand, if object 362 is a "nuisance" object and authorized object 361 is also contained in storage compartment 217, human operator 312 can send instructions 332 to vehicle 210 instructing vehicle 210 to proceed to a designated location, such as, a delivery location or a return location.

Object 362 may be a dangerous or hazardous object. In response (and whether or not authorized object 361 is also contained in storage compartment 217), human operator 312 can send instructions 372 to vehicle 210 instructing vehicle 210 to proceed to a designated safer location (e.g., away from other vehicles and people). Human operator 312 can also notify authorities including passing along the identity and last known location of person 343.

Thus, generally, an autonomous vehicle can detect an event purported to alter the content of a vehicle compartment. For example, an autonomous vehicle can detect opening and closing a vehicle compartment (an event) to purportedly remove an object from or insert an object into the vehicle compartment. A machine-learning camera can monitor the vehicle compartment for any disturbances relative to a (e.g., previously memorized) background image permeated on an interior surface of the vehicle compartment after the event. For example, the machine-learning camera can monitor a vehicle compartment for any disturbances relative a background pattern after the vehicle compartment is opened and closed.

The autonomous vehicle can determine if the content of the vehicle compartment accords with a defined event outcome based on any monitored disturbances. For example, if the autonomous vehicle was making a delivery, the autonomous vehicle can determine if the vehicle compartment is empty based on any monitored disturbances after the vehicle compartment was opened and closed. If the autonomous vehicle was making a pickup, the autonomous vehicle can determine the presence of an object in the vehicle compartment based on any monitored disturbances after the vehicle compartment was opened and closed.

The autonomous vehicle can modify the configuration of the autonomous vehicle based on the determination. Modifying the configuration of the autonomous vehicle can include sending a notification to a central hub, sending imagery to a central hub, staying at a location, driving back to a prior location, driving to a new location, driving to a safer location, etc.

Figure 4:
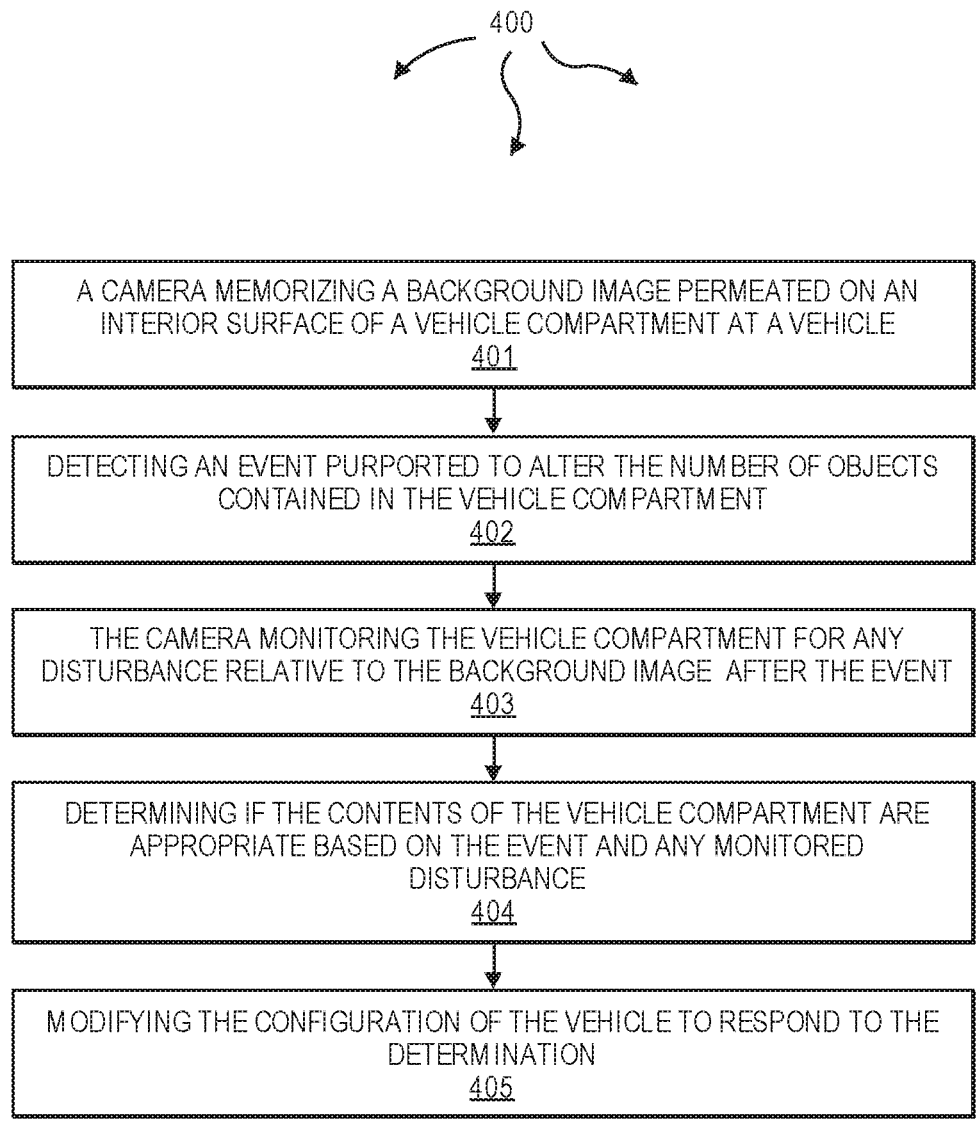
FIG. 4 illustrates a flow chart of an example method for changing the configuration of an autonomous vehicle based on the contents of a vehicle storage compartment.

FIG. 4 illustrates a flow chart of an example method 400 for changing the configuration of an autonomous vehicle based on the contents of a vehicle storage compartment. Method 400 will be described with respect to the components and data in computer architectures 300 and 350.

Method 400 includes a camera memorizing a background image permeated on an interior surface of a vehicle compartment at the vehicle (401). For example, camera 303 can memorize background 302. Method 400 includes detecting an event purported to alter the number of objects contained in the vehicle compartment (402). For example, computing device 215 can detect person 313 opening and closing storage compartment 217 to purportedly remove object 321 (a removal event). Alternatively, computing device 215 can detect person 343 opening and closing storage compartment 217 to purportedly insert object 361 (an insertion event).

Method 400 includes the camera monitoring the vehicle compartment for any disturbance relative to the background image after the event (403). For example, camera 303 can monitor storage compartment 301 for any for disturbance relative to background 302 after person 313 purportedly removed object 321. Alternatively, camera 303 can monitor storage compartment 301 for any disturbance relative to background 302 after person 343 purportedly inserted object 361.

Method 400 includes determining if the contents of the vehicle compartment are appropriate based on the event and any monitored disturbance (404). For example, computing device 215 can determine if the contents of storage compartment 217 are appropriate or inappropriate based on person 313 purporting to remove object 321 (the removal event) and any monitored disturbance in background 302. Computing device 215 can consider the contents of storage compartment 217 to be appropriate when camera 303 considers storage compartment 217 to be empty after the removal event. On the other hand, computing device 215 can consider the contents of storage compartment 217 to be inappropriate when camera 303 detects the presence of an object in storage compartment 217 after the removal event.

Alternatively, computing device 215 can determine if the contents of storage compartment 217 are appropriate based on person 343 purporting to insert object 361 into storage compartment 217 (the insertion event) and any monitored disturbance in background 302. Computing device 215 can consider the contents of storage compartment 217 to be appropriate when camera 303 detects the presence of an object in storage compartment 217 after the insertion event (although human confirmation based on imagery may still occur). On the other hand, computing device 215 can consider the contents of storage compartment 217 to be inappropriate when camera 303 considers storage compartment 217 to be empty after the insertion event.

Method 400 includes modifying the configuration of the vehicle to respond to the determination (405). For example, the configuration of vehicle 210 can be modified to respond to a determination that storage compartment 217 is appropriately or inappropriately empty or appropriately or inappropriately contains an object. Modifying the configuration of vehicle 210 can include sending a notification to a central hub, sending imagery to a central hub, staying at a location, driving back to a prior location, driving to a new location, driving to a safer location, etc. How the configuration of vehicle 210 is modified can vary depending on the contents of storage compartment 217 matching or not matching an expected outcome.

For example, if vehicle 210 is making a delivery, detecting that storage compartment 217 is empty after customer contact is an expected outcome. As such, changing the configuration of vehicle 210 can include instructing vehicle 210 to drive to a new location. On the other hand, detecting that storage compartment 217 still contains an object after customer contact is an unexpected outcome. As such, changing the configuration of vehicle 210 can include sending a notification and imagery to a central hub. Depending whether or not the object belongs to the customer, is a "nuisance" object, or is dangerous or hazardous object, vehicle 210 can be instructed to stay at a location, return to a warehouse or store, or drive to a safer location respectively.

The configuration of vehicle 210 can be similarly varied when pickup up an object depending on the contents of storage compartment 217 matching or not matching an expected outcome.

Figure 5A:
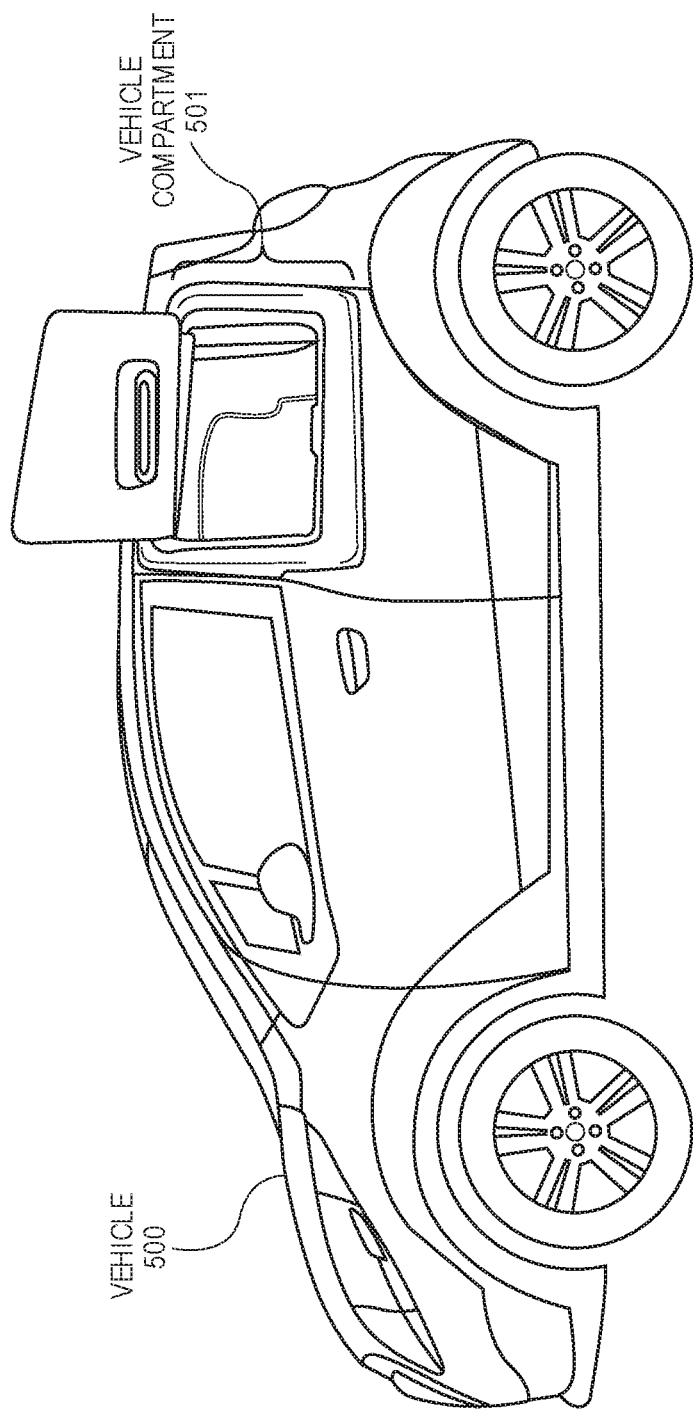
FIG. 5A illustrates an example vehicle including a vehicle compartment.
Figure 5B:
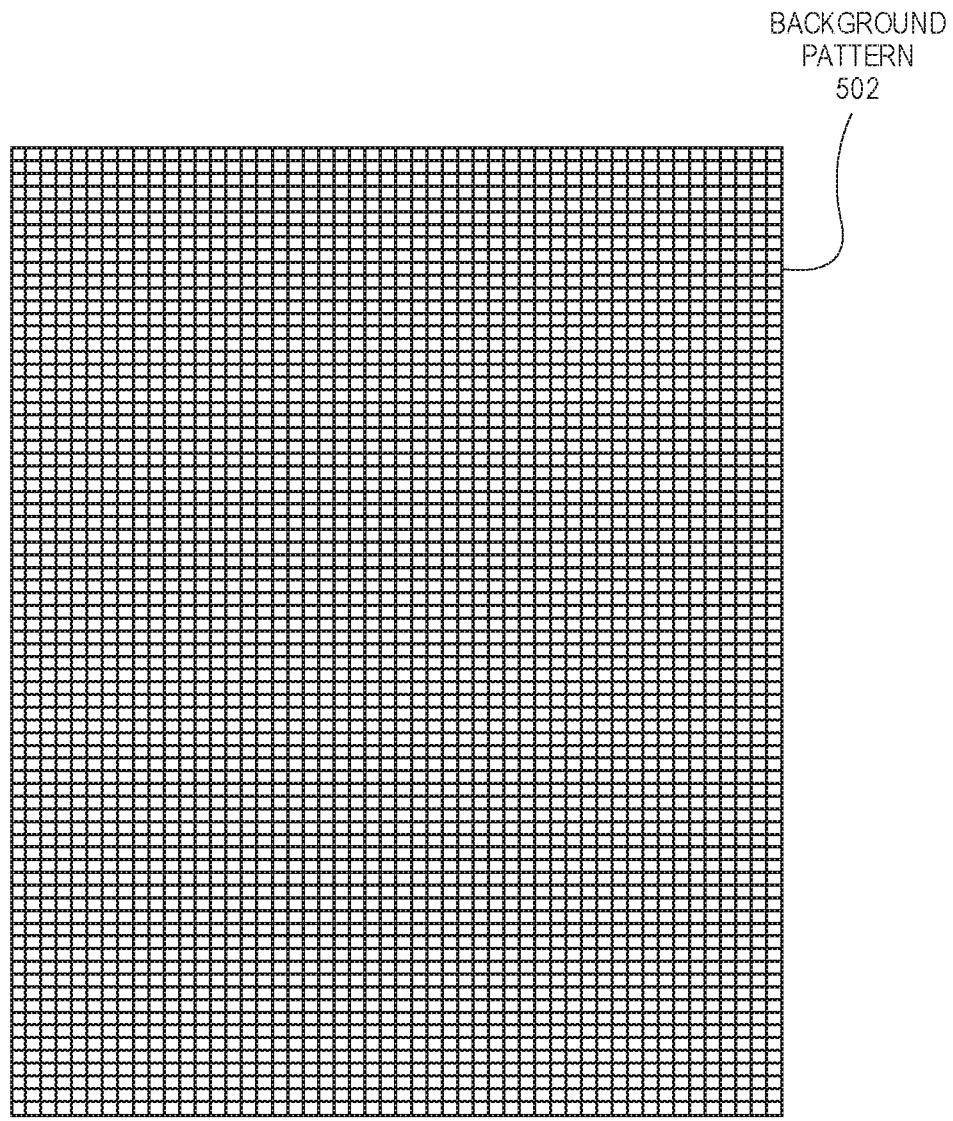
FIG. 5B illustrates an example background pattern.
Figure 5C:
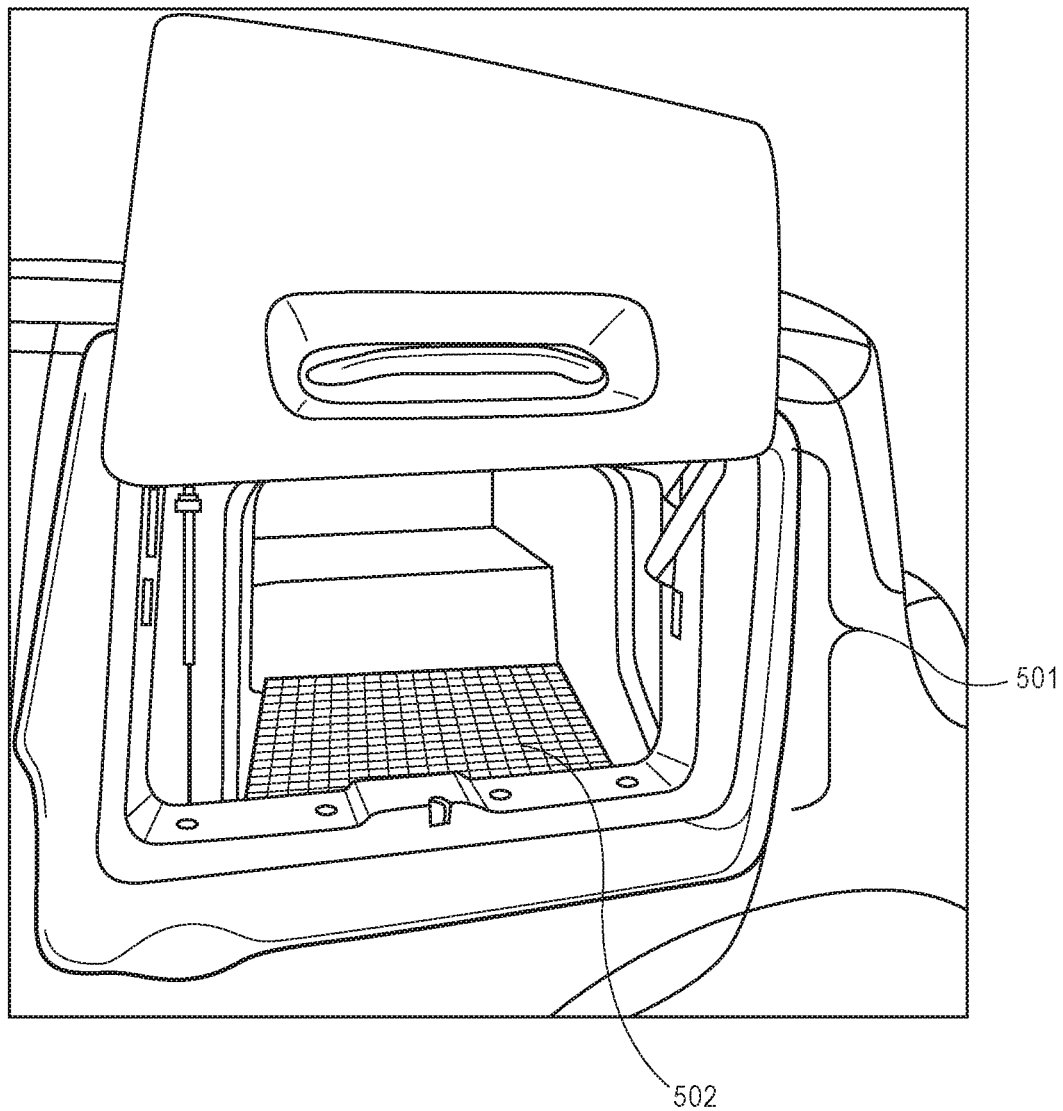
FIG. 5C illustrates the example background pattern of FIG. 5B permeated to an interior surface of the vehicle compartment of FIG. 5A.

FIG. 5A illustrates an example vehicle 500 including a vehicle compartment 501 (i.e., a pizza warming oven). FIG. 5B illustrates an example background pattern 502. FIG. 5C illustrates the example background pattern 502 permeated to an interior surface of the vehicle compartment 501. A machine-learning camera (not shown) can be mounted to the top of vehicle compartment 501 and have a lens pointed down towards background pattern 502. The machine-learning camera can memorize background pattern 502 as a reference image indicating that vehicle compartment 501 is empty.

Figure 5D:
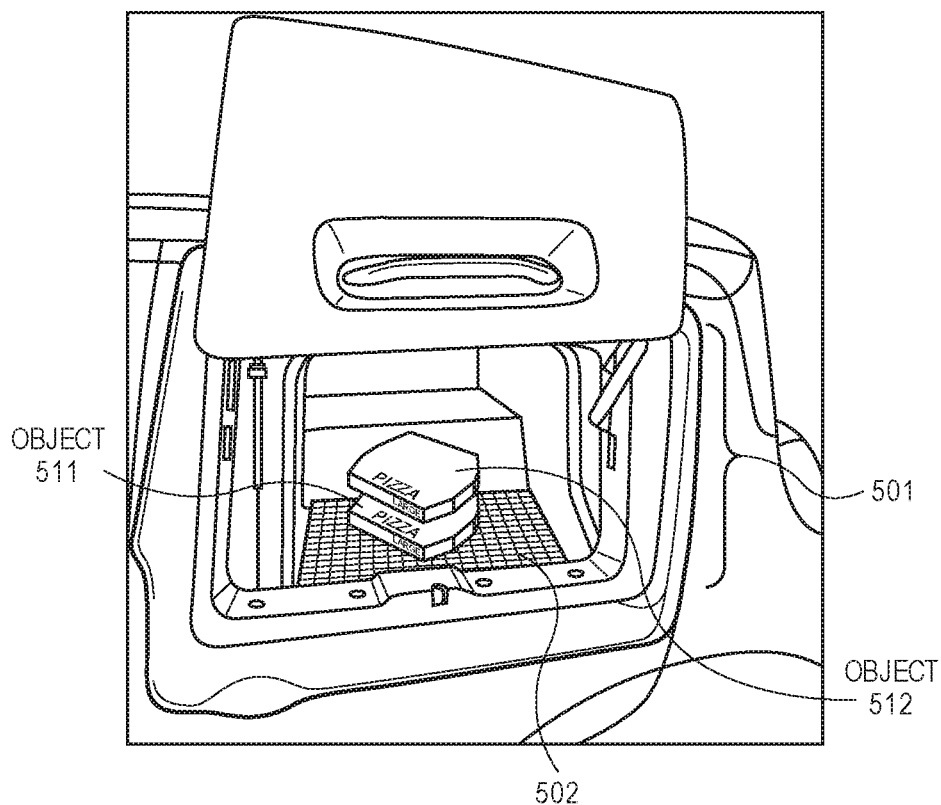
FIG. 5D illustrates an example view of objects in the vehicle compartment of FIG. 5A on top of the example background pattern of FIG. 5B.
Figure 5E:
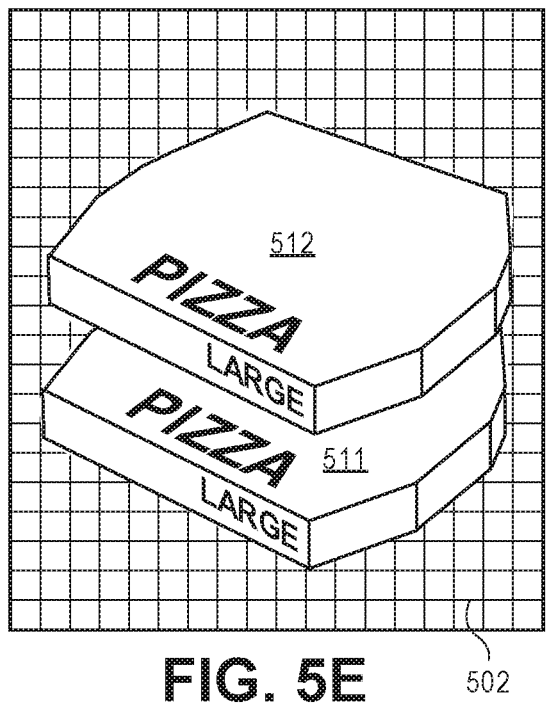
FIG. 5E illustrates an example magnified view of the objects of FIG. 5D on top of the example background pattern of FIG. 5B.
Figure 5F:
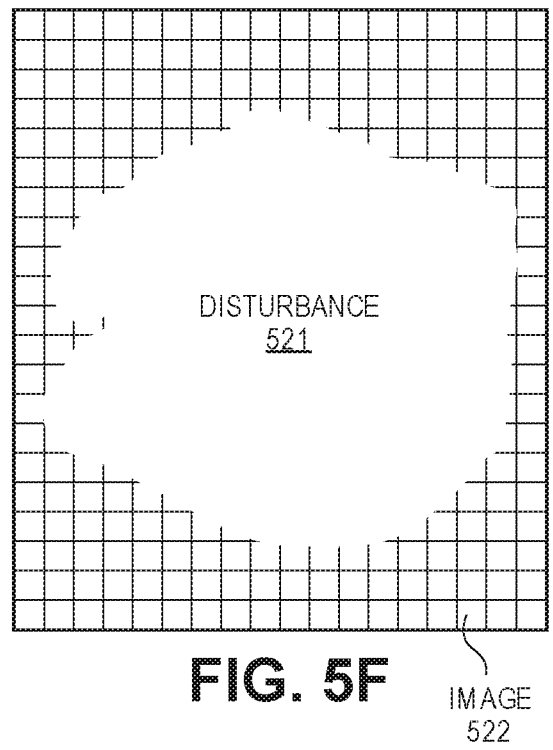
FIG. 5F illustrates an example image captured by a camera mounted above the example background pattern of FIG. 5B in the vehicle compartment of FIG. 5A.

FIG. 5D illustrates an example view of objects 511 and 512 (i.e., pizza boxes) in the vehicle compartment 501 on top of background pattern 502. FIG. 5E illustrates an example magnified view of the objects 511 and 512 on top of background pattern 502. FIG. 5F illustrates an image 522 captured by the machine-learning camera (not shown) mounted to the top of vehicle compartment 501 above background pattern 502. As depicted, objects 511 and 512 are loaded into vehicle compartment 501. Image 522 depicts disturbance 521, a non-zero difference between the reference image and an image of objects 511 and 512 sitting on top of background 502. Disturbance 521 indicates the presence of one or more objects in vehicle compartment 501. If a customer ordered two pizzas, vehicle 500 would expect the presence of one or more objects in vehicle compartment 501. As such, no notifications or warnings are sent to a central hub (e.g., back to a delivery service).

Figure 5G:
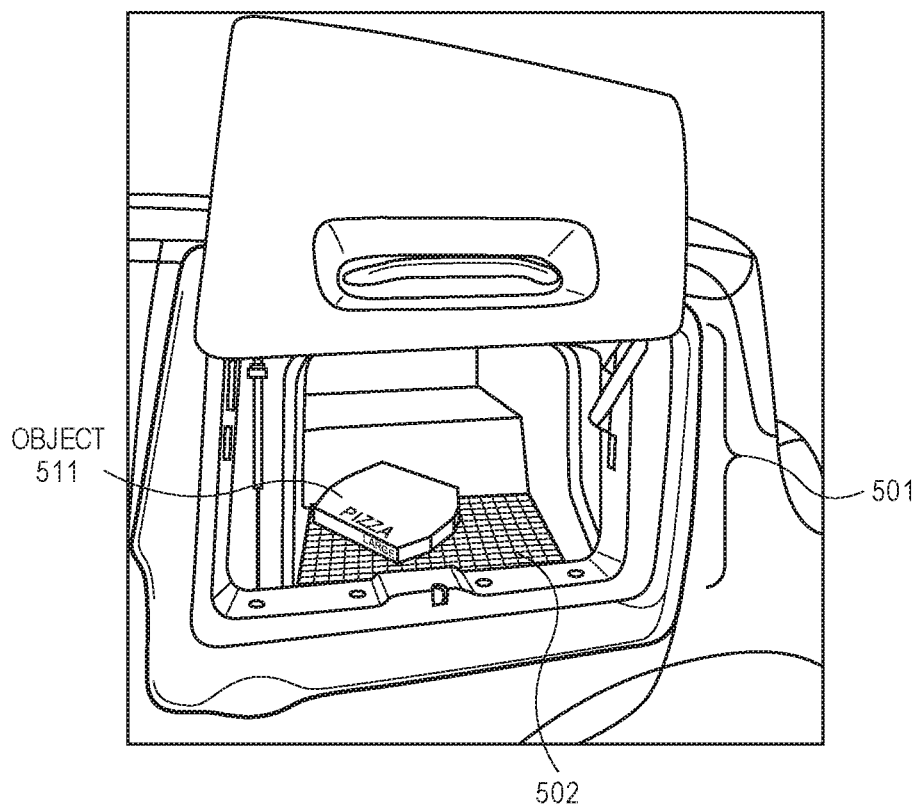
FIG. 5G illustrates another example view of an object in the vehicle compartment of FIG. 5A on top of the example background pattern of FIG. 5B.
Figure 5H:
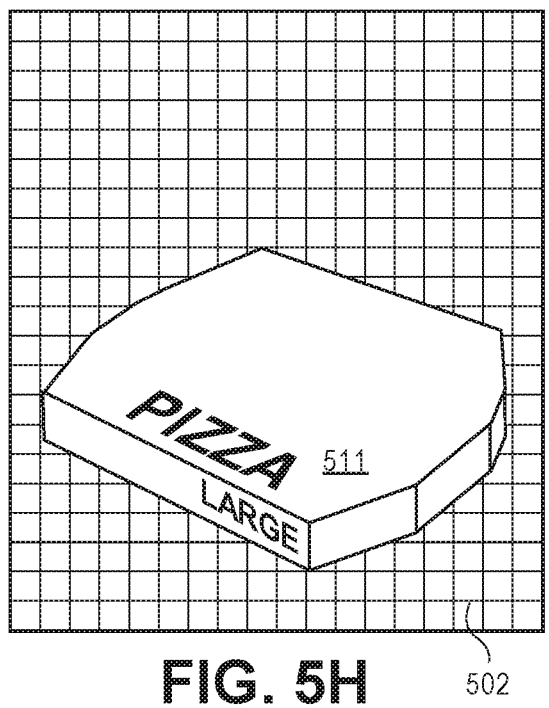
FIG. 5H illustrates an example magnified view of the object of FIG. 5G on top of the example background pattern of FIG. 5B.
Figure 5I:
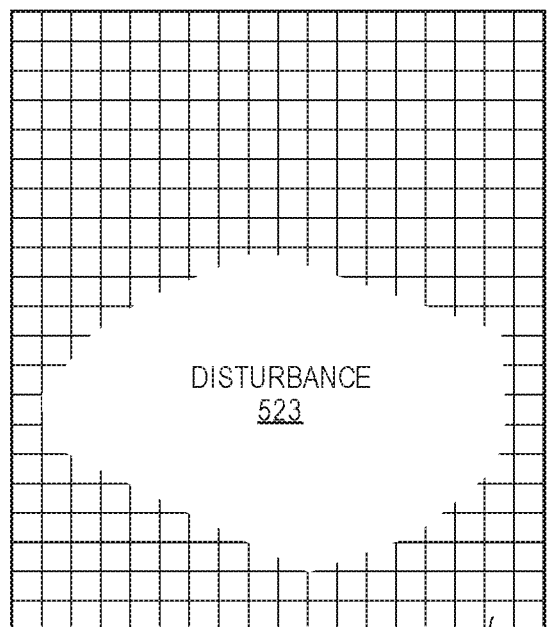
FIG. 5I illustrates another example image captured by the camera mounted above the example background pattern of FIG. 5B in the vehicle compartment of FIG. 5A.

FIG. 5G illustrates another example view of object 511 in vehicle compartment 501 on top of background pattern 502. Object 511 can be a pizza that was not initially retrieved by a customer. FIG. 5H illustrates an example magnified view of the object 511 on top of background pattern 502. FIG. 5I illustrates image 524 captured by the machine-learning camera (not shown). Image 524 depicts disturbance 523, a non-zero difference between the reference image and an image of object 511 sitting on top of background 502. Disturbance 523 indicates the presence of one or more objects in vehicle compartment 501.

Since vehicle 500 expects the customer would take both of their pizzas, disturbance 523 can trigger a notification or warning to a central hub (e.g., back to the delivery service). Vehicle 500 can also send imagery similar to FIG. 5H to the central hub for evaluation by a human operator. From the imagery, the human operator can tell that the customer left a pizza in vehicle compartment 501. The human operator can then notify the customer via text, email, or voice that they left a pizza in vehicle compartment 501. The human operator can also prevent vehicle 501 from leaving the customer's delivery location until the customer returns and retrieves their other pizza.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, background features, background patterns, reference images, imagery, notifications, messages, autonomous vehicle instructions, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, background features, background patterns, reference images, imagery, notifications, messages, autonomous vehicle instructions, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

The invention claimed is:

1. At a vehicle, a method comprising:
    driving the vehicle to a customer location with an empty vehicle storage compartment so that a customer at the customer location can return an object to a store or warehouse;
    detecting an event purported to alter the content of the compartment at the vehicle, wherein detecting an event purported to alter the content of the compartment at the vehicle comprises detecting that the object has been placed in and left in the compartment by the customer;
    monitoring, with a camera, the compartment for disturbances relative to a background image permeated on an interior surface of the compartment after the event, wherein the background image includes a principal feature or a pattern separate from a footprint of the compartment, and wherein the principal feature or the pattern comprises a screen image having a plurality of thru-holes, the screen image being provided on a localized region of the compartment;
    determining if the content of the compartment accords with a defined event outcome based on any monitored disturbances;
    driving the vehicle to the store or warehouse so that the object can be returned; and
    removing the object from the compartment at the store or warehouse.

2. The method of claim 1, further comprising the camera memorizing the background image with respect to the compartment prior to detecting the event.

3. The method of claim 1, wherein driving the vehicle to a customer location comprises manually driving the vehicle to the customer location.

4. The method of claim 1, further comprising, before driving the vehicle to the customer location, monitoring the compartment to confirm that the compartment is empty, and if the compartment is not empty, notifying a human operator in order to autonomously return the vehicle to the store or warehouse for unloading.

5. The method of claim 1, further comprising, after removing the object from the compartment at the store or warehouse:
    driving the vehicle to a second customer location with the compartment in an empty state so that a second customer at the second customer location can return a second object to a store or warehouse;
    detecting a second event purported to alter the content of the compartment at the vehicle, wherein detecting the second event purported to alter the content of the compartment at the vehicle comprises detecting that the second object has been placed in and left in the compartment by the customer;

determining that the second object is a dangerous or hazardous object and in response, sending an alert to an authority with an identity and last known location of the second customer, and instructing the vehicle to autonomously proceed to a designated safer location away from other vehicles and people.

6. The method of claim 1, wherein the background image is inside the visible light spectrum and visible to a human eye.

7. The method of claim 1, wherein the background image is outside the visible light spectrum.

8. The method of claim 1, wherein the screen image is only provided on the localized region of the compartment, and not other regions of the compartment.

9. The method of claim 1, wherein the localized region of the compartment comprises a planar surface of the compartment.

10. A method at a vehicle, the method comprising:

driving the vehicle to a customer location with an empty vehicle storage compartment so that a customer at the customer location can return an object to a store or warehouse;

a camera memorizing a background image permeated on an interior surface of the compartment at the vehicle;

detecting an event such that the object is placed in and left in the compartment;

the camera monitoring the vehicle compartment for any disturbance relative to the background image after the event, wherein the background image includes a principal feature or a pattern separate from a footprint of the compartment, and wherein the principal feature or the pattern comprises a screen image having a plurality of thru-holes, the screen image being provided on a localized region of the compartment;

determining if the contents of the vehicle compartment are appropriate based on the event and any monitored disturbance;

driving the vehicle to the store or warehouse so that the object can be returned; and removing the object from the compartment at the store or warehouse.

11. The method of claim 10, wherein a camera memorizing a background image permeated on an interior surface of the compartment comprises a machine-learning camera learning spectral, spatial, and temporal features of the background image.

12. The method of claim 10, wherein a camera memorizing a background image permeated on an interior surface of the compartment comprises a machine-learning camera memorizing a background image that is outside the visible light spectrum.

13. A vehicle, the vehicle comprising:

a compartment having an interior surface permeated with a background image;

a camera mounted inside the compartment;

a processor; and system memory coupled to the processor and storing instructions configured to:

cause the vehicle to drive to a customer location with the compartment in an empty state so that a customer at the customer location can return an object to a store or warehouse;

cause the camera to memorize the background image;

cause the processor to detect an event such that the object is placed in and left in the compartment;

cause the camera to monitor the compartment for any disturbance relative to the background image after the event, wherein the background image includes a principal feature or a pattern separate from a footprint of the compartment, and wherein the principal feature or the pattern comprises a screen image having a plurality of thru-holes, the screen image being provided on a localized region of the compartment;

cause the processor to determine if the contents of the compartment are appropriate based on the event and any monitored disturbance;

cause the vehicle to drive to the store or warehouse so that the object can be returned; and cause the object to be removed from the compartment at the store or warehouse.

14. The vehicle of claim 13, wherein instructions configured to cause the camera to memorize the background image comprise instructions configured to cause the camera to learn spectral, spatial, and temporal features of a principal feature or a pattern of the background image.

* * * * *